United States Patent

Downey et al.

[15] 3,642,229
[45] Feb. 15, 1972

[54] MOTION PICTURE CASSETTE WITH SELF-ALIGNING FILM-HANDLING SYSTEM

[72] Inventors: Rogers B. Downey, Lexington; Gerald H. Cook, Lynnfield, both of Mass.

[73] Assignee: Polaroid Corporation, Cambridge, Mass.

[22] Filed: Dec. 16, 1969

[21] Appl. No.: 885,454

[52] U.S. Cl. .............................................. 242/199, 352/72
[51] Int. Cl. .................. G03b 1/04, G11b 15/32, G11b 23/04
[58] Field of Search .................. 242/71.1, 71.2, 76, 197–200, 242/55.19 A; 352/72–78; 95/19; 226/190–195, 180

[56] References Cited

UNITED STATES PATENTS

| | | | |
|---|---|---|---|
| 2,223,525 | 12/1940 | Miller | 352/75 |
| 2,872,842 | 2/1959 | Grass | 352/75 |
| 2,894,702 | 7/1959 | Heath et al. | 242/76 |
| 3,334,835 | 8/1967 | Kaneko | 242/71.2 |
| 3,486,710 | 12/1969 | McKee | 242/71.8 |

*Primary Examiner*—Leonard D. Christian
*Attorney*—Brown and Mikulka, William D. Roberson and Robert L. Berger

[57] ABSTRACT

A motion-picture film-handling cassette having a pair of coplanar spools to which the opposite ends of a strip of photographic material are connected. To facilitate reversible transport of the film strip between the aforementioned spools and across a film gate of the cassette, a spur gear accessible exteriorly of the cassette is axially connected to each spool. Intermediate each spool and the film gate, the strip of photographic material is disposed around a plurality of idlers. Each idler and spool is uniquely mounted for pivotal as well as rotational movement within the cassette. Apertures are provided through the cassette housing adjacent the ends of certain such idlers whereby externally mounted force applying members may be selectively introduced into the cassette to snub such idlers. Complementary portions of the cassette housing and of the idlers adjacent such apertures form a light seal.

18 Claims, 8 Drawing Figures

INVENTORS
GERALD H. COOK
ROGERS B. DOWNEY
BY
Brown and Mikulka
and
Robert L. Berger
ATTORNEYS

PATENTED FEB 15 1972
3,642,229
SHEET 2 OF 2
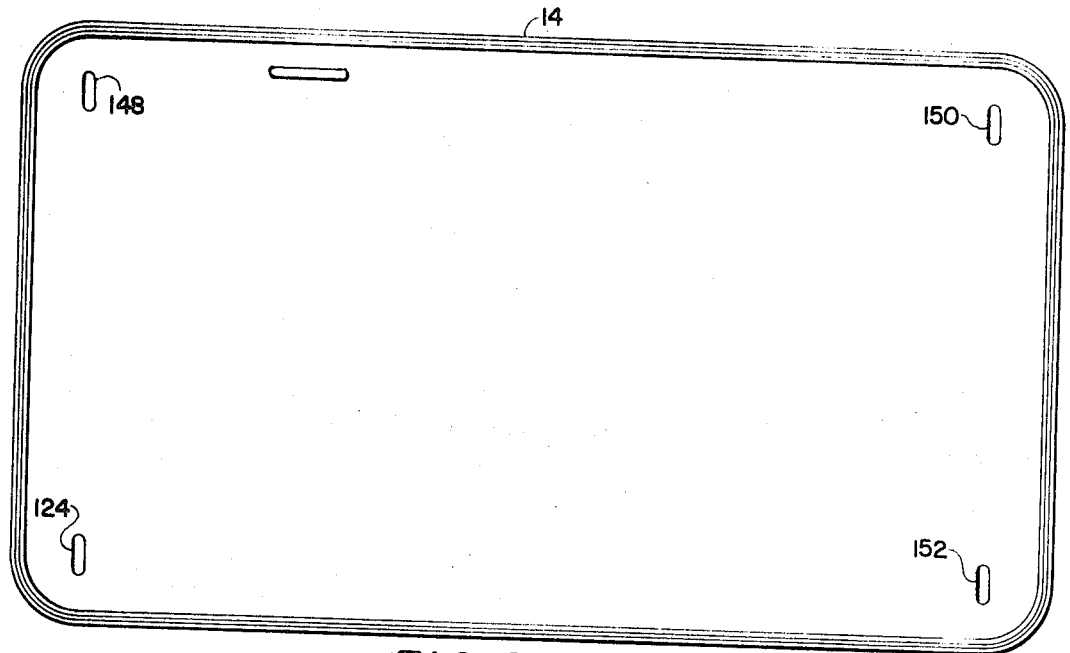
FIG. 2
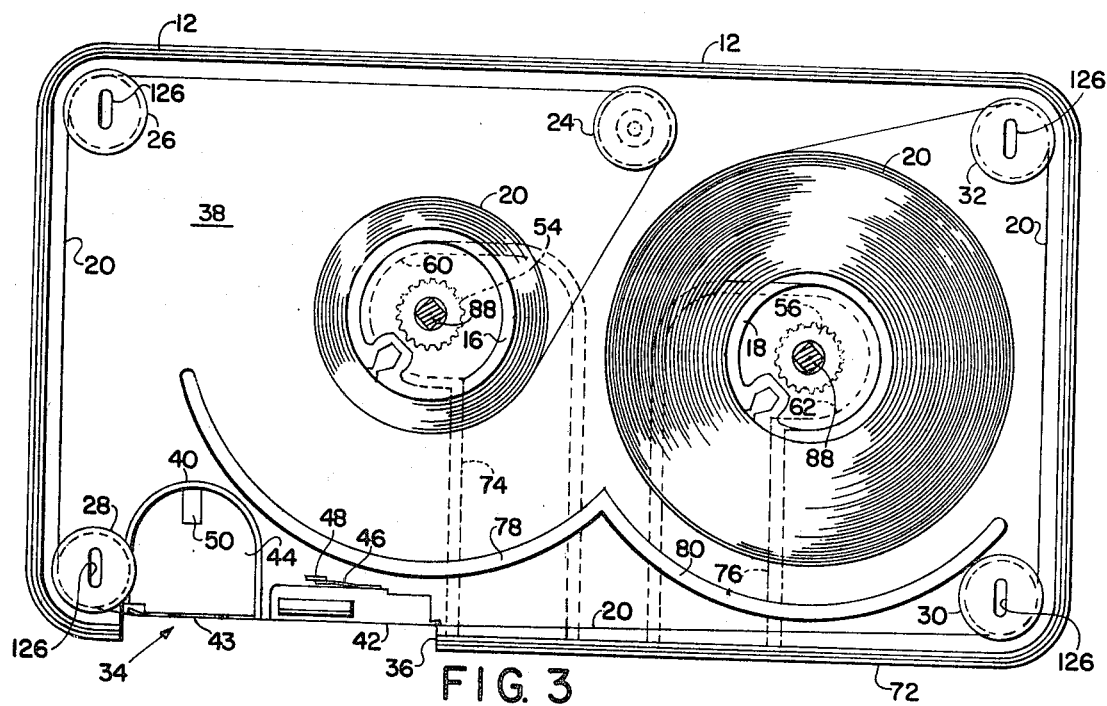
FIG. 3
FIG. 4
INVENTORS
GERALD H. COOK
ROGERS B. DOWNEY
BY *Brown and Mikulka*
and
*Robert L. Berger*
ATTORNEYS 3,642,229

MOTION PICTURE CASSETTE WITH SELF-ALIGNING FILM-HANDLING SYSTEM

BACKGROUND OF THE INVENTION

Field of the Invention

This invention relates to photography and, more particularly, to a motion picture cassette having an improved film-handling system.

Description of the Prior Art

Many important improvements have been made in recent years in motion picture photography to reduce or simplify the functions performed by the operator. In this respect, cassette or cartridge systems are now playing a major role in this rapidly expanding field. For example, film-handling cassettes are now available which are adapted to be quickly mounted as a unit into a camera for exposure purposes. After the film has been exposed, the cassette containing the film can be quickly removed from the camera and mailed to a processing laboratory. Also, specially designed projectors are now available which accept quick-mounting cassettes containing fully processed film. These latter systems not only greatly ease the job of projecting the film, but also provide a convenient and permanent storage container for the film, i.e., a cassette from which it is never necessary to withdraw the film for projection purposes.

Most recently, radically different cassette systems have been developed which permit the photographer himself to quickly and easily process and project a strip of motion picture film shortly after the pictures have been taken. Exemplary of such new and unique systems are those described in the following copending applications:

| Serial No. | Inventor(s) | Filing Date |
| --- | --- | --- |
| 755,901 | Edwin H. Land | Aug. 28, 1968 |
| 761,771 | Rogers B. Downey | Sept. 23, 1968 |
| 767,609 | Herbert A. Bing | Oct. 15, 1968 |
| 766,481 | Rogers B. Downey | Nov. 18, 1968 |
| 722,789 | Vaito K. Eloranta Benjamin C. Ruggles | Nov. 1, 1968 |
| 788,897 | Rogers B. Downey | Jan. 3, 1969 |
| 813,427 | Rogers B. Downey | Apr. 4, 1969 |
| 813,469 | Rogers B. Downey | Apr. 4, 1969 |
| 813,586 | Rogers B. Downey Paul W. Thomas | Apr. 4, 1969 |
| 838,822 | Rogers B. Downey Gerald H. Cook | July 3, 1969 |
| 838,783 | Rogers B. Downey Philip G. Baker Gerald H. Cook | July 3, 1969 |
| 838,794 | Rogers B. Downey | July 3, 1969 |
| 838,793 | Philip G. Baker | July 3, 1969 |
| 838,832 | Rogers B. Downey Philip G. Baker Gerald H. Cook | July 3, 1969 |
| 873,279 | Rogers B. Downey | Nov. 3, 1969 |

All of these copending applications are assigned to the assignee of the present invention. The systems described therein employ a film-handling cassette and, in most instances, one from which the film is not removed during the exposure, processing and projection operations.

Obviously, in order for film-handling systems of these various types to enjoy widespread popularity, it is necessary that the cost of the cassettes be low, i.e., the consumer must not be required to pay an unreasonable premium for the convenience provided by such systems. This requirement for a low-cost cassette is an extremely critical consideration, the importance of which cannot be overemphasized.

During motion picture exposure and projection operations, the film strip is normally drawn onto a takeup spool driven through a slip clutch arrangement. In this connection, after passing through the film gate and prior to being coiled on the takeup spool, the film strip is normally disposed around a nonrotating surface in order to isolate the torque of the takeup spool and resulting film tension from that section of the film strip disposed across the pressure plate. Sometimes, it is desirable that this surface be arranged so as to be stationary when the film strip is being drawn onto the takeup spool and to rotate with the film strip whenever it is returned therefrom to the supply spool. Along these same lines, there is considerable interest on the part of motion picture enthusiasts for systems having a reverse projection capability.

One of the objects of this invention, therefore, is to provide an improved motion-picture-film-handling cassette.

Another primary object of this invention is to provide a cassette of the type indicated which includes an improved film-handling system.

An additional object to this invention is to provide a cassette of the type indicated which includes a self-aligning, or "-floating," film-handling system.

A further object of this invention is to provide an improved arrangement for selectively snubbing certain idlers in film-handling cassettes without adversely affecting the lighttight nature thereof.

Also, an object of this invention is to provide a cassette of the type indicated which employs a self-aligning, or "floating,"film-handling idler.

A still further object of this invention is to provide an improved motion picture film-handling cassette which facilitates reverse projection of a film strip housed therein.

Additionally, an object of this invention is to provide a cassette of the type indicated which comprises parts which are relatively inexpensive to manufacture and which facilitate relatively inexpensive assembly operations.

SUMMARY OF THE INVENTION

The illustrated embodiments of this invention include features which are applicable for use in exposure operations, projection operations and/or operations wherein a film strip is permanently retained within a multipurpose film-handling cassette during exposure, processing and projection. Importantly, the cassette of this invention includes a self-aligning film-handling system having a unique lighttight snubbing arrangement adapted to provide the cassette with a reverse projection capability.

In its illustrated embodiments, the invention is depicted in connection with a cassette which may be used during both exposure and projection operations. More specifically, the opposite ends of a strip of photographic material are respectively connected to coplanar spools of the cassette with a substantial portion of that photographic material initially coiled around one such spool. In order to provide means for effecting reversible transport of the film strip between the two spools, a spur gear is axially connected to each such spool so as to be accessible exteriorly of the cassette's housing.

The cassette also includes a film gate across which the film strip is transported in its advancement from one spool to the other. Mounted behind the film strip in operable relationship to the cassette's film gate is a light-reflecting element and, further, the cassette includes access means whereby light rays from an external light source may be selectively introduced thereinto and onto such light-reflecting element.

Intermediate the two cassette spools the film strip is disposed around a plurality of idlers, at least one of such idlers being positioned intermediate each spool and the cassette's film gate. Apertures are provided through the cassette's housing adjacent the ends of these particular idlers to facilitate the selective introduction of externally mounted force applying members into the cassette for purposes of snubbing such idlers. Unique mounting arrangements are provided for the idlers and the spools to facilitate both rotational and pivotal movement of those members within the cassette. In order to preclude light rays from penetrating the interior of the cassette through the aforementioned apertures in the cassette's housing, complementary portions are formed on the idlers and the adjacent sections of the cassette's housing to effect a light seal around each such aperture. Those portions of the cassette and of the idlers adapted to contact each other are formed of a material having a relatively low coefficient of friction while those portions of the snubbable idlers adapted to contact the filmstrip are formed of a material having a relatively high coefficient of friction. Several embodiments are shown for that aspect of the invention associated with the snubbing of selected idlers while maintaining the lighttight nature of the interior of the cassette housing.

The cassette comprising the illustrated embodiments of this invention may initially be furnished with a strip of unexposed photosensitive material. With such a cassette mounted in an appropriate camera, and with force-applying members of that camera-snubbing idlers of the cassette intermediate its film gate and takeup spool, images may be selectively recorded on the film strip as it is drawn across the film gate onto the takeup spool. The exposed film strip may be drawn from the cassette through its film gate as a loop for processing. Thereafter it is returned into the cassette being substantially entirely coiled around the supply spool. When inserted into a projector unit, the spur gears attached to both spools are selectively engageable with drive gears of that unit whereby the filmstrip can be alternately drawn onto the takeup spool and returned to the supply spool. As the filmstrip traverses the film gate for projection purposes on its way to the takeup spool, force applying members of the projector snub certain idlers of the cassette intermediate the film gate and takeup spool. If desired, force-applying members of the projector may be employed to snub certain idlers of the projector intermediate the film gate and supply spool during the return of the film strip thereto to facilitate reverse projection operations.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawings wherein like numbers have been employed in the different figures to denote the same parts and wherein:

FIG. 2 is a diagrammatic interior plan view of one of the housing members of the cassette shown in FIG. 1;

FIG. 3 is a diagrammatic interior plan view of the other housing member of the cassette shown in FIG. 1 illustrating the arrangement of certain elements associated therewith;

FIG. 4 is a fragmentary diagrammatic vertical sectional view of the cassette of FIG. 1 illustrating the nature of, and the mounting arrangement for, the spools of that cassette;

DESCRIPTION OF A PREFERRED EMBODIMENT

Figure 1:
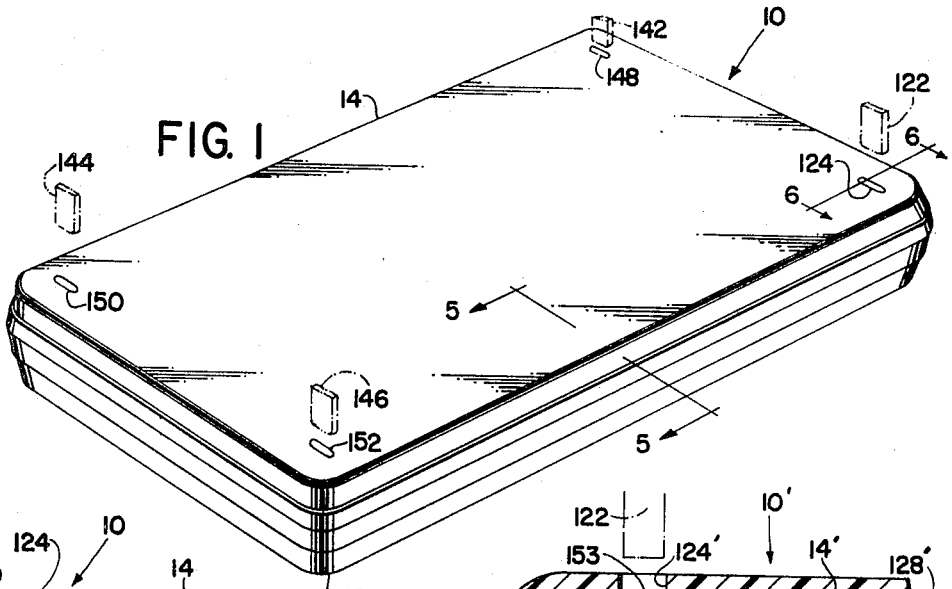
FIG. 1 is a diagrammatic perspective view of a motion-picture-film-handling cassette embodying features of this invention.

The illustrated embodiments of this invention relate to a motion-picture-film-handling cassette which may be employed in both film exposure and projection operations. Film processing is facilitated by withdrawing the film strip in a loop from the cassette's film gate. As such, the film structure may advantageously comprise both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black-and-white images, a silver halide developer and a silver halide solvent are applied in an aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superimposed. It has generally been the practice, in the completion of this process, to separate the silver-receptive and silver halide strata in order to render the positive image visible, particularly when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive images in superposition provide a composite that presents a good image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black-and-white image which can be viewed by transmitted light without the necessity of removing the processed, negative image containing photosensitive layer are shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. Pats. of Edwin H. Land U.S. Pat. No. 2,726,154 issued Dec. 6, 1955 and U.S. Pat. No. 2,944,894 issued July 12, 1960. All of these prior patents are assigned to the assignee of the present invention.

However, it should be noted that the present invention is not directed to particular film structures or to the chemistry by which visible images are formed in an exposed photosensitive material and/or formed in an image-receiving stratum associated therewith. While the illustrated embodiments of the invention advantageously may employ a film structure not requiring the removal of the photosensitive layer after visible image formation is completed, the invention itself is also applicable for use in other motion-picture-film-handling cassettes employing different types of film structures.

This invention may best be understood by first referring to FIGS. 1, 2 and 3 of the drawings, which illustrate a cassette exemplary of the types which may advantageously incorporate the features of the present invention. As shown therein, a compact motion-picture-film-handling cassette 10 is basically constituted by a pair of housing members 12 and 14 connected together by a solvent, ultrasonic bonding, or other suitable means, to form an enclosed opaque housing. In this embodiment, the cassette 10 is relatively flat and generally rectangular parallelepiped in configuration.

A supply spool 16 and a takeup spool 18 are coplanarly mounted within the cassette 10 for rotation about spaced parallel axes. An unexposed strip of photographic material 20 of the type previously indicated, provided with perforations 22 and with leaders affixed to the supply spool 16 and to the takeup spool 18, is initially substantially entirely coiled around the supply spool. Passing from the supply spool 16 to the takeup spool 18, the strip of photographic material 20 sequentially travels around idlers 24, 26, 28, 30 and 32.

Intermediate the idlers 28 and 30 the film strip 20 passes through an exposure and projection station 34. In this connection, cutout portions of the housing members 12 and 14 define an opening or film gate 36 through which image carrying light rays may enter and leave the cassette 10 and, further, through which an aperture plate (not shown) of a camera and projector may be introduced into the cassette. Also, the sidewall 38 of the cassette 10 includes an opening 40 communicating with the film gate 36 for purposes which will subsequently become obvious. Mounted within the exposure and projection station 34 so as to be in alignment with the opening 36 is a pressure plate assembly 42 having an aperture 43 and which mounts a light-reflecting element 44. It will be noted that this light-reflecting element 44 is disposed in operable relationship to both the opening or film gate 36 and the opening 40 in the cassette's sidewall 38. Thus, for projection purposes, light rays from an externally mounted light source may be introduced into the cassette 10 through the opening 40 onto the reflecting element 44 which redirects those rays outwardly of the cassette through the pressure plate's aperture 43 and the section of film strip 20 disposed thereacross. Preferably, this light-reflecting element 44 may take a configuration similar to the prismatic element described in more detail in the aforementioned copending application Ser. No. 767,609 of Herbert A. Bing. As such, it includes a concave light-receiving transparent face adjacent the cassette's opening 40 and a flat reflecting surface which reflects light received into the element through its concave transparent face outwardly thereof through a convex transparent face adjacent the film strip 20.

The pressure plate assembly 42 also includes a leaf spring 46 which seats against a boss 48 formed integrally with the housing member 12 to continually urge that assembly towards the cassett's opening 36. This assembly 42 is mounted within the cassette 10 so that it may be displaced inwardly of the cassette away from the opening 36 against the force of the spring 46 whenever an aperture plate of a camera or projector (not shown) is positioned in operative relationship therewith. Forming part of the assembly 42 is a mounting bracket 50 which serves to fixedly position the light-reflecting element 44 with respect to the pressure plate assembly and, more particularly, with respect to the aperture 43 of that assembly.

Axially connected to the supply spool 16 and to the takeup spool 18, respectively, are a pair of spur gears 54 and 56. These spur gears 54 and 56 are positioned flush with the generally flat exterior surface of the cassette's sidewall 38. More specifically, these gears 54 and 56 are respectively mounted for rotation within recessed portions 60 and 62 of that sidewall 38.

Extending from an edge 72 of the cassette 10, in which edge the opening or film gate 36 is formed, into communication with the recessed portions 60 and 62, respectively, are a pair of channels 74 and 76. These channels 74 and 76 are spaced closer together than are the axes of the spur gears 54 and 56 so as to respectively form, in conjunction with the recessed portions 60 and 62, substantially right angle depressions in the generally flat exterior surface of the cassette's sidewall 38. This arrangement permits a pair of external coplanarly mounted driving spur gears to be displaced along the channels 74 and 76 from a position adjacent the cassette's edge 72 into engagement with the cassette's spur gears 54 and 56. When such externally mounted driving spur gears are adapted to alternately drive the cassette's gear 56 in a clockwise direction and the cassette's gear 54 in a counterclockwise direction (as viewed in FIG. 3 of the drawings), means are available to effect reversible transport of the filmstrip 20 between the spools 16 and 18 and through the exposure and projection station 34. Light sealing arcuate members 78 and 80 respectively serve to control the disposition of the filmstrip 20 around the spools 16 and 18 during such operations. It will be noted that, in arrangements of this type, the plane of the axes of each cassette spur gear 54 and 56 and its associated externally mounted driving spur gear is generally perpendicular to the channels 74 and 76.

Reference is now made to FIG. 4 of the drawings which illustrates in more detail the nature of the supply spool 16 and the mounting arrangement therefor within the cassette 10. As shown therein, the spur gear 54 is mounted on one end of an axle 82 journaled through a bearing 84 formed integrally with the housing member 12. The spool 16 is mounted at one end of the axle 82 being provided with a rectangular opening adapted to receive a section 88 of the axle which is also rectangular in cross section. Further, this axle 82 terminates in a flattened radially extending lip 90 which serves to retain the spool 16 with the spool properly positioned within the cassette 10 and the spur gear 54 positioned in the recessed portion 60 formed in the exterior surface of the cassette's wall 38. It is important to note that a small amount of clearance is provided between the rectangular section 88 of the axle 82 and the spool's opening 86. Additionally, a small amount of clearance is provided between the radially extending section 92 of the spool 16 and the adjacent portions of the bearing 84 and flattened lip 90. This mounting arrangement permits a certain amount of pivotal movement of the spool 16 on the axle 82 during advancement of the flimstrip within the cassette 10. The configuration of the takeup spool 18 and its mounting arrangement within the cassette 10 may be identical to the configuration of, and the mounting arrangement for, the supply spool 16.

Figure 5:
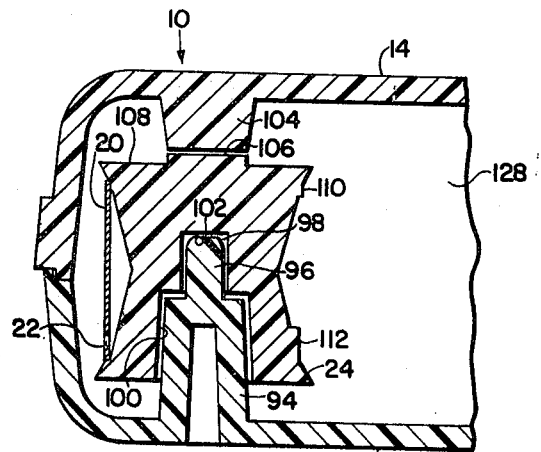
FIG. 5 is a fragmentary diagrammatic vertical sectional view taken generally along line 5—5 of FIG. 1 illustrating the nature of a particular idler housed within the cassette.

FIG. 5 illustrates the nature of the idler 24 and its mounting arrangement within the cassette 10. More specifically, a tapered cylindrical post 94 extends inwardly of the cassette 10 from its housing member 12. This post 94 terminates in a reduced cylindrical end portion 96 provided with a peripheral taper 98. Extending axially of the idler 24 is a specially configured recess 100 adapted to receive a portion of the post 94 to facilitate the mounting of the idler thereon. When seated on the post 94, a surface 102 of the recess 100 is in contact with the end of the post. Extending inwardly of the cassette 10 from the housing member 14 in alignment with the post 94 is a boss 104 which serves to restrain the idler 24 on that post. The size and configuration of the recess 100 is such that a small clearance exists between the portions thereof, other than its surface 102, and adjacent portions of the post 94. Also, a small amount of clearance is provided between the end of the boss 104 and the adjacent surface 106 of the end 108 of the idler 24. It will be recognized that these clearances permit the idler 24 to pivot a small amount on the post 94 as it rotates about that member.

The peripheral surface of the idler 24 is formed with a pair of spaced apart flanged portions 110 and 112 disposed a greater distance from the axis of the idler than are those portions of the idler's peripheral surface intermediate thereof. These flanged portions 110 and 112 are sized and spaced apart a carefully predetermined distance so that respective edge sections of the filmstrip 20 are seated thereon as the filmstrip passes around the idler. In this connection, the portion of the filmstrip 20 adapted to have images recorded thereon is positioned intermediate of the flanged portions 110 and 112 and, consequently, out of contact with the idler's peripheral surface.

Figure 6:
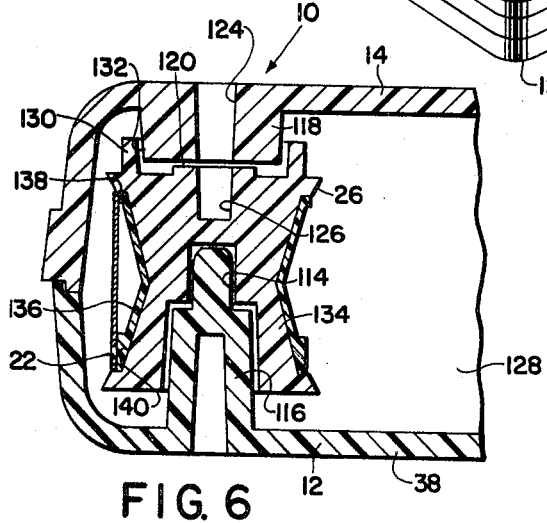
FIG. 6 is a view similar to FIG. 5 taken generally along line 6—6 of FIG. 1 illustrating the nature of the snubbable idlers mounted within the cassette.

The configurations of, and mounting arrangements for, the idlers 26, 28, 30 and 32 are identical and are best illustrated in FIG. 6 of the drawings. As shown therein, the idler 26 is provided with a recess 114 which facilitates its mounting on a post 116. It will be noted that the recess 114 and post 116 are identical respectively to the idler recess 100 and post 94 illustrated in FIG. 5. A boss 118, formed integrally with the housing member 14, extends inwardly of the cassette in alignment with the post 116. This boss 118 serves to restrain the idler 26 on the post 116 within the cassette 10. The small amount of clearance provided between the sides of the post 116 and the adjacent portions of the idler's recess 114, and between the boss 118 and the end surface 120 of the idler 26, allow for a limited amount of pivotal movement of the idler on that post during rotation thereof within the cassette 10. Means are provided for selectively snubbing the idler 26 with an external force-applying member 122 (See FIG. 1). In this connection, access means in the form of an elongated aperture 124 is provided through the housing member 14 in axial alignment with the post 116. Also, the idler 26 is provided with an elongated recess 126 having a cross-sectional configuration substantially the same as that of the aperture 124 and located to be aligned with that recess at one rotational position of the idler 26. It will thus be appreciated that the force applying member 122 may be selectively introduced into the cassette 10 and more particularly into the idler's recess 126 to effect positive engagement between that member and the idler whereby further rotational movement of that idler within the cassette is prevented.

In order to preclude light rays passing into the cassette's aperture 124 from being introduced into the interior 128 of the cassette 10, light sealing means are provided around that aperture. More specifically, an annular projection 130 extends from the end surface 120 of the idler 26 into complementary closely spaced side-by-side relationship with the peripheral surface 132 of the boss 118. The small amount of clearance between the idler's annular projection 130 and the boss' peripheral surface 132 facilitates rotational and pivotal movement of the idler 26 on the post 116 while effectively precluding light rays from entering the interior 128 of the cassette 10 through the aperture 124.

In order to facilitate rotational movement of the idler 26 within the cassette 10, it is highly desirable that those portions of the idler and other components of the cassette 10 adapted to contact each other at such time be formed of a material having a relatively low coefficient of friction. For instance, the main body portion 134 of the idler 26 including its annular projection 130, and at least the boss 118 and post 116 may be formed of a low-friction polymeric material such as an acrylic, a polystyrene or acetal. It will further be recognized that the snubbing action of the idler 26 with respect to the filmstrip 20 will be enhanced if those portions of the idler 26 adapted to contact the filmstrip are formed of a material having a relatively high coefficient of friction. Thus, a peripheral portion 136 of the idler 26 may, for instance, be formed of a relatively high friction polymeric material such as a polyurethane. The opposite edges of the filmstrip 20 seat on respective shoulders 138 and 140 of this relatively high-friction material such that the portion of the filmstrip adapted to have images recorded thereon is disposed in spaced apart relationship with the idler 26. In this manner, there is no contact between the idler 26 and the image-recording section of the film strip 20 as the filmstrip passes around that idler.

Advantageously, the idler 26 may be formed by an inexpensive two-step injection-molding process employing the materials suggested. First, the main body portion 134 of the idler is formed in an injection mold. Then this main body portion is employed in a second injection molding process wherein the relatively high-friction material, including its shoulders 138 and 140, is formed around the periphery of the idler's main body 134. It will also be appreciated that the cassette's housing members 12 and 14 and certain parts associated therewith, e.g., the posts 94 and 116, the bosses 104 and 118, the arcuate members 78 and 80, the bearings 84 and the boss 48 may, if desired, also be formed from an acrylic, a polystyrene or acetal thermoplastic resin in an inexpensive injection molding process. Similarly, the spur gears 54 and 56, the axles 82 associated therewith, and the spools 16 and 18 may be formed by similar types of molding processes employing the same material.

Various details of the cassette 10 do not constitute part of the present invention and, obviously, may readily take forms other than those described. Some of these features, e.g., the pressure plate assembly, the light-reflecting element and the film gate arrangement are the subject of certain of the aforementioned copending applications.

As indicated, the cassette 10 may be initially furnished with its strip of photographic material 20 in an unexposed, photosensitive state and substantially entirely coiled around the supply spool 16. This cassette 10 is adapted for use with a motion picture camera (not shown) consisting of a plurality of conventional components normally associated with such photographic apparatus, e.g., a battery, a motor, a takeup-spool-driving arrangement, an intermittent clawlike film advancement mechanism, an aperture plate, a shutter and a lens system. These components of the camera are arranged such that, as the cassette 10 is inserted into that device, a driving gear thereof slides along the cassette's channel 76 into engagement with the gear 56. Additionally, when the cassette is fully inserted into the camera, its pressure plate assembly 42 has been displaced inwardly of the cassette so that the section of the filmstrip 20 disposed thereacross is positioned in the proper focal plane for exposure purposes. Further, at such time, the camera's intermittent film advancement mechanism is disposed in operable relationship with that section of the filmstrip 20 positioned across the pressure plate assembly 42 and the camera's lens and shutter are aligned with the cassette's film gate 36.

This camera also includes a pair of displaceably mounted force-applying members adapted to be introduced into the cassette 10 through its elongated apertures 150 and 152 to effect a snubbing of the cassette's idlers 30 and 32, respectively. In this connection, the camera may include a conventional mechanism for driving these force applying members inwardly of the cassette after the cassette is mounted in the camera or, more preferably, these force applying members may be spring mounted within the camera so as to be displaced in a direction away from the cassette during the cassette insertion process and to automatically enter the cassette through its apertures 150 and 152 when the cassette is fully seated in the camera. During the exposure operations, the idlers 30 and 32 are thus effectively snubbed while light rays are precluded from entering the interior 128 of the cassette 10 through the apertures 150 and 152. As the photosensitive film strip 20 is drawn across the film gate 36 in incremental steps and subsequently coiled around the takeup spool 18, images of the scene being photographed are recorded thereon.

After the exposure operations have been completed, the filmstrip 20 is drawn from the cassett's film gate 36 as a loop and treated with a compatible processing fluid by any suitable arrangement.

Once the film strip 20 has been processed to develop visible images from the latent images recorded thereon, it is drawn back into the cassette 10 so as to be substantially entirely coiled around the supply spool 16, extending therefrom around the idlers 24, 26, 28, 30 and 32 onto the takeup spool 18. The cassette, and more specifically the processed filmstrip 20 housed therein, are now ready for projection operations.

As the cassette 10 is inserted into the projector unit (not shown), which may advantageously take the form of that described in the aforementioned copending application Ser. No. 873,279 of Rogers B. Downey filed on Nov. 3, 1969, drive gears of that unit slide along the cassette's channels 74 and 76, respectively, into selective engagement with the supply spool 16 and takeup spool 18. These drive gears of the projector are adapted to selectively and alternately cause clockwise rotation of the supply spool 16 and counterclockwise rotation of the takeup spool 18 (as viewed in FIG. 3 of the drawings) to effect reversible transport of the film strip 20 across the film gate 36. When fully inserted into the projector unit, the cassette's opening 40 is positioned in operable relationship with a light source of that unit, while its pressure plate assembly 42 and film gate 36 are automatically positioned in operative relationship with that unit's aperture plate and intermittent film advancement mechanism. In this connection, the projector's aperture plate displaces the pressure plate assembly 42 inwardly of the cassette 10 such that the section of the filmstrip 20 disposed therebetween is positioned in the proper plane for projection purposes. At such time, the force-applying member 122 of the projector unit is disposed in alignment with the cassette's elongated aperture 124, while force-applying members 142, 144 and 146 (See FIG. 1) of that unit are respectively disposed in alignment with the cassette's elongated apertures 148, 150 and 152 adjacent the ends of the idlers 28, 30 and 32.

The projector unit includes other conventional elements normally associated with such equipment. For instance, it includes a shutter and a projection lens located so as to be automatically positioned in operable relationship with the cassette's film gate 36 when the cassette 10 is mounted therein. The projector may include a rear projection screen or, alternately, a remote screen may be setup in alignment with its projection lens.

Once the cassette 10 has been fully inserted into the projector unit, the force applying members 144 and 146 are displaced into the cassette 10 so as to seat in the recesses 126 of the idlers 30 and 32, respectively, whereby further rotational movement of those idlers is precluded. The projector's light source may then be energized and its motor connected to both its drive gear engaging the cassette's spur gear 56 and to that unit's intermittent film advancement mechanism. As a result of these operations, the visible images recorded on the film strip 20 are projected onto the aforementioned screen for viewing purposes as the film strip is drawn across the film gate 36 in incremental steps and coiled onto the cassette's takeup spool 18. During these operations, the projector unit's force applying members 144 and 146 effectively snub the idlers 30 and 32, respectively.

With the filmstrip 20 coiled around the takeup spool 18, reverse projection of the visible images recorded thereon may be effected by first withdrawing the force applying members 144 and 146 from the cassette 10 or, more specifically, from engagement with the idlers 30 and 32, respectively, and then displacing the projector unit's force applying members 122 and 142 through the cassette's elongated apertures 124 and 148 so that the ends thereof respectively seat in the recesses 126 of the idlers 26 and 28. These operations permit the cassette's idlers 30 and 32 to once again rotate on their respective posts 116 while precluding further rotation of the cassette's idlers 26 and 28. With the projector's light source energized and its motor connected to the cassette's spur gear 54, the filmstrip 20 is advanced across the film gate 36 in intermittent steps in the direction of the supply spool 16 and coiled around that spool.

It will be noted that during these exposure and projection operations, the unique mounting arrangements for spools 16 and 18 and the idlers 24, 26, 28, 30 and 32 provide a self-aligning or "floating" film-handling system, i.e., these elements are not only mounted for rotation within the cassette 10, but are also free to pivot therewithin so as to accommodate any changes in the orientation of the strip of photographic material 20. The aforementioned clearances between these pivoting, rotating members and the adjacent nonmoving portions of the cassette 10 may, typically be on the order of 0.002 to 0.008 inch. A self-aligning or "floating" film handling system of this type has two important aspects, both of which contribute significantly to reduce the cost of producing the cassette 10. First, these elements and the mounting components thereof need not be manufactured to close tolerances. Secondly, assembly operations associated with such a film handling system require less time than would be necessary to assemble a system wherein close tolerances are a critical requirement.

DESCRIPTION OF THE EMBODIMENT OF FIG. 7

Figure 7:
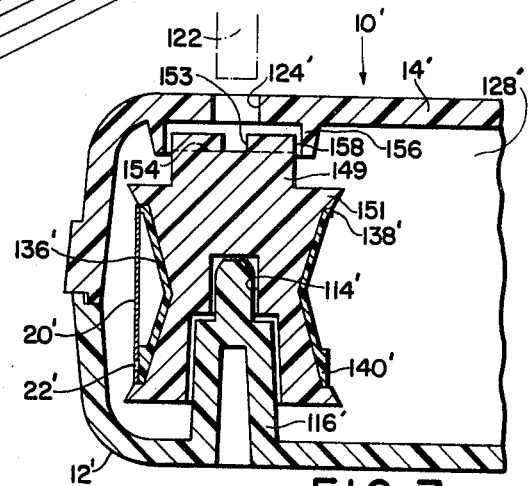
FIG. 7 is a view similar to FIG. 6 illustrating an alternate embodiment of snubbable idlers suitable for use in connection with the present invention.

An alternate arrangement for the idler of FIG. 6 is illustrated in FIG. 7 of the drawings. As shown therein, a reduced end section 149 of an idler 151 extends into close proximity of the interior face of the cassette's housing member 14'. This end section 149 is provided with a pair of elongated recesses 153 and 154 disposed at right angles with respect to each other. An annular projection 156 extends interiorly of the cassette 10' from the inside face of its housing member 14' so as to be disposed in closely spaced side-by-side relationship with the peripheral surface 158 of the idler's reduced end section 149. Thus these members, i.e., the annular projection 156 and the reduced end section 149 of the idler 151 cooperate to preclude light rays passing through the cassette's aperture 124' and into the interior 128' of the cassette 10'. At the same time, the idler 151 is free to pivot a limited amount on, as well as to rotate about, the post 116'. It will be appreciated that the externally mounted force applying member 122' may be selectively introduced into the cassette 10' through its aperture 124' to seat in either the idler's recess 153 or 154 whereby further rotational movement of that idler 151 is precluded.

DESCRIPTION OF THE EMBODIMENT OF FIG. 8

Figure 8:
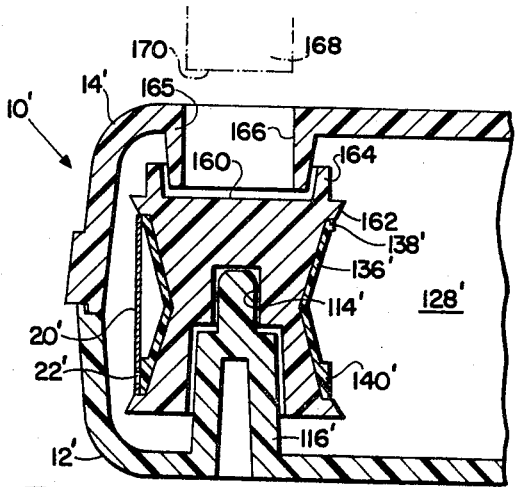
FIG. 8 is a view similar to FIG. 6 illustrating still another alternate embodiment of a snubbable idler suitable for use in connection with the present invention.

FIG. 8 illustrates another alternate arrangement of the idler of FIG. 6. In this arrangement, the end surface 160 of an idler 162 intermediate an annular projection 164 is relatively flat. The cassette's housing member 14' is provided with a boss 165 having an aperture 166 through which an externally mounted force-applying member 168 may be inserted into frictional contact with the idler's surface 160. In this embodiment of the invention, rotational movement of the idler 162 within the cassette 10' is restrained only by the frictional forces between the end 170 of the force-applying member 168 and the idler's end surface 160. Consequently, in this embodiment, it is desirable that the end 170 of the force-applying member 168 be relatively large in area and that the cassette's aperture 166 be appropriately sized to facilitate the passage of that member therethrough.

As indicated, the features of this invention have been illustrated with respect to a cassette suitable for use, first, in connection with the exposure of a photosensitive strip of motion picture film and, subsequently, in connection with film projection operations. Subsequent to the exposure operations and prior to the projection operations, the filmstrip is drawn as a loop from the cassette for processing. It will be appreciated that the features of this invention may also be incorporated in a cassette intended to be used only for exposure or projection operations. In the former instance, it would not be necessary to provide snubbable idlers intermediate the supply spool and the film gate. In the latter case, it would obviously not be necessary to provide a light seal adjacent the cassette apertures through which the force applying, idler snubbing members are introduced into the cassette. Additionally, if a reverse projection capability is not a requirement in an exclusively projection-type cassette, it would not be necessary to provide snubbable idlers intermediate the supply spool and the film gate.

Those skilled in the art will recognize that the features of this invention are also applicable for use in connection with multipurpose cassettes which incorporate a processing station and from which the filmstrip need not be removed during exposure, processing and projection operations.

In the FIG. 8 embodiment of this invention, when the force applying member 168 is in contact with the idler 162, rotational movement of that idler is restrained only by frictional forces existing between the force applying member's end surface 170 and the idler's surface 160. In contrast thereto, in the FIG. 6 and 7 embodiments of this invention, the idlers 26 and 151 are actually "engaged" by the force-applying members 122 and 122', respectively. More specifically, the force-applying member 122 seats in the recess 126 of the idler 26, while the force-applying member 122' seats in either the recess 153 or the recess 154 of the idler 150.

The terms "projection," "projection unit," "projector," etc., are used herein in a comprehensive sense, i.e., to broadly refer to those systems wherein the visible images recorded on a sheet of material are reimaged for viewing purposes and are not restricted to only those systems in which the recorded visible images are projected onto a screen of one type or another.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

We claim:

1. A motion-picture-film handling cassette comprising:
a housing;
a strip of photographic material substantially entirely coiled within said housing;
a film gate permitting image-carrying light rays to be introduced into and/or projected from said cassette;
means for advancing said strip of photographic material within said housing from its initial coiled position past said film gate, said means including a post extending inwardly of said cassette from one wall of said housing and an idler mounted on said post and around which said idler said strip of photographic material is disposed during its advancement past said film gate, said idler being provided with an axially extending recess configured to receive at least an end portion of said post when mounted thereon to facilitate the rotation of said idler about said post and to permit said idler to pivot on said post to accommodate variations in the orientation of said strip of photographic material with respect to said post during the advancement thereof within said housing; and
a boss extending inwardly of said cassette from the wall of said housing opposite said one wall in alignment with said post to restrain said idler on said post.

2. The cassette of claim 1 wherein said post and said boss are formed integrally with their respective said walls.

3. A motion picture film handling cassette comprising:
a housing;
a strip of photographic material substantially entirely coiled within said housing;
a film gate permitting image-carrying light rays to be introduced into and/or projected from said cassette;
means for advancing said strip of photographic material within said housing from its initial coiled position past said film gate, said means including a post and an idler mounted on said post and around which said idler said strip of photographic material is disposed during its advancement past said film gate, said idler being provided with an axially extending recess configured to receive at least an end portion of said post when mounted thereon to facilitate the rotation of said idler about said post and to permit said idler to pivot on said post to accommodate variations in the orientation of said strip of photographic material with respect to said post during the advancement thereof within said housing; and
access means for permitting an externally mounted force-applying member to be selectively introduced into said cassette axially of said idler into contact with said idler to restrain rotational movement of said idler on said post.

4. A motion picture film-handling cassette comprising:
a housing;
a strip of photographic material substantially entirely coiled within said housing;
a film gate permitting image-carrying light rays to be introduced into and/or projected from said cassette;
means for advancing said strip of photographic material within said housing from its initial coiled position past said film gate, said means including a post and an idler mounted on said post and around which said idler said strip of photographic material is disposed during its advancement past said film gate, said idler being provided with an axially extending recess configured to receive at least an end portion of said post when mounted thereon to facilitate the rotation of said idler about said post and to permit said idler to pivot on said post to accommodate variations in the orientation of said strip of photographic material with respect to said post during the advancement thereof within said housing;
access means for permitting an externally mounted force-applying member to be selectively introduced into said cassette into contact with said idler to restrain rotational movement of said idler on said post; and
means for preventing light rays passing into said access means from being introduced into the interior of said cassette including a projection on the end of said idler spaced from said recess.

5. The cassette of claim 4 wherein at least those portions of said post and of said idler adapted to contact each other are formed of a first material having a relatively low coefficient of friction and those portions of said idler adapted to contact said strip of material are formed of a second material having a relatively high coefficient of friction.

6. The cassette of claim 5 wherein said second material is disposed around the peripheral section of said idler and includes spaced apart flanged portions, disposed a greater distance from the axis of said idler than those portions thereof intermediate said flanged portions, against which the edges of said strip of photographic material are respectively seated during the advancement of said strip of photographic material within said cassette.

7. The cassette of claim 4 wherein said end of said idler and said force-applying member are configured to effect an engagement therebetween to restrain rotational movement of said idlers.

8. The cassette of claim 4 wherein at least a portion of said end of said idler is substantially flat such that rotational movement of said idler is restrained by frictional forces between such force-applying member and said idler.

9. The cassette of claim 4 wherein said projection is circular in cross section and said light ray preventing means additionally includes an annular projection extending from said housing and around said access means into side-by-side relationship with the peripheral edge portion of said circular projection.

10. The cassette of claim 4, wherein said projection is annular in configuration and said light ray preventing means additionally includes a projection extending from said housing and around said access means into side-by-side relationship with said annular projection of said idler.

11. The cassette of claim 10 wherein the end of said circular projection is spaced a small distance from said housing so that said housing restrains said idler on said post while permitting said idler to pivot on said post.

12. The cassette of claim 10 wherein said second mentioned projection is spaced a small distance from said end of said idler to restrain said idler on said post while permitting said idler to pivot on said post.

13. The cassette of claim 4 additionally including means for returning said strip of photographic material past said film gate to its original coiled position within said housing including at least a second post and a second idler mounted on said second post and around which said second idler said strip of photographic material is disposed during its return to its original coiled position, said second idler being provided with an axially extending recess configured to receive at least an end portion of said post when mounted thereon to facilitate the rotation of said second idler about said post and to permit said second idler to pivot on said post to accommodate variations in the orientation of said strip of photographic material with respect to said second post during such return thereof within said housing, second access means for permitting an externally mounted force-applying member to be selectively introduced into said cassette into contact with said second idler to restrain rotational movement of said second idler on said second post and means for preventing light rays passing into said second access means from being introduced into the interior of said cassette including a projection on the end of said second idler spaced from said recess of said second idler, whereby said first mentioned idler may be selectively snubbed during such advancement of such strip of photographic material and said second idler may be selectively snubbed during such return of said strip of photographic material.

14. A motion-picture-film-handling cassette comprising:

a housing;

a strip of photographic material substantially entirely coiled within said housing;

a film gate permitting image-carrying light rays to be introduced into and/or projected from said cassette;

means for advancing said strip of photographic material within said housing from its initial coiled position past said film gate, said means including a post, an idler mounted on said post and around which said idler said strip of photographic material is disposed during its advancement past said film gate, said idler being provided with an axially extending recess configured to receive at least an end portion of said post when mounted thereon to facilitate the rotation of said idler about said post and to permit said idler to pivot on said post to accommodate variations in the orientation of said strip of photographic material with respect to said post during the advancement thereof within said housing, a takeup spool disposed in generally coplanar relationship to said idler and to which one end of said strip of photographic material is connected, and means for rotationally and pivotally mounting said takeup spool within said housing; and means for returning said strip of photographic material to its originally coiled position within said housing after said strip of photographic material has been advanced past said film gate comprising a supply spool disposed in generally coplanar relationship to said idler and around which said strip of photographic material is initially substantially entirely coiled and to which the other end of said strip of photographic material is connected and means for rotationally and pivotally mounting said supply spool within said housing.

15. The cassette of claim 14 wherein said returning means additionally includes a second post and a second idler mounted on said second post and around which said second idler said strip of photographic material is disposed at least during its return to its original coiled position within said housing, said second idler being provided with an axially extending recess configured to receive at least an end portion of said second post when mounted thereon to facilitate the rotation of said second idler about said second post and to permit said second idler to pivot on said second post to accommodate variations in the orientation of said strip of photographic material with respect to said post during the return thereof within said housing and wherein said first idler engages said strip of photographic material subsequent to its passing said film gage during such advancement thereof sand said second idler engages said strip of photographic material subsequent to its passing said film gate during such return thereof and additionally comprising first access means for permitting an externally mounted force applying member to be selectively introduced into said cassette into contact with said first idler to restrain rotational movement of said first idler on said first post, means for preventing light rays passing into said first access means form being introduced into the interior of said cassette including a projection on the end of said first idler spaced from said recess, second access means for permitting an externally mounted force-applying member to be selectively introduced into said cassette into contact with said second idler to restrain rotational movement of said second idler on said second post and means for preventing light rays passing into said second access means from being introduced into the interior of said cassette including a projection on the end of said second idler spaced from said recess of said second idler, whereby said first idler may be selectively snubbed during such advancement of said strip of photographic material and said second idler may be selectively snubbed during such return of said strip of photographic material.

16. A motion-picture-film-handling cassette comprising:
a housing;
a strip of photographic material substantially entirely coiled within said housing;
a film gate permitting image-carrying light rays to be introduced into and/or projected from said cassette;
means for advancing said strip of photographic material within said housing from its initial coiled position past said film gate, said means including a post and an idler mounted on said post and around which said idler said strip of photographic material is disposed during its advancement past said film gate, said idler being provided with an axially extending recess configured to receive at least an end portion of said post when mounted thereon to facilitate the rotation of said idler about said post;
access means for permitting an externally mounted force applying member to be selectively introduced into said cassette into contact with said idler to restrain rotational movement of said idler on said post; and
means for preventing light rays passing into said access means from being introduced into the interior of said cassette including complementary surfaces extending from said housing and said idler.

17. A motion-picture-film-handling cassette comprising:
a housing;
a strip of photographic material substantially entirely coiled within said housing;
a film gate permitting image-carrying light rays to be introduced into and/or projected from said cassette;
means for advancing said strip of photographic material within said housing from its initial coiled position past said film gate, said means including a post, an idler mounted on said post and around which said idler said strip of photographic material is disposed during its advancement past said film gate, said idler being provided with an axially extending recess configured to receive at least an end portion of said post when mounted thereon to facilitate the rotation of said idler about said post and to permit said idler to pivot on said post to accommodate variations in the orientation of said strip of photographic material with respect to said post during the advancement thereof within said housing, and a takeup spool disposed in generally coplanar relationship to said idler and to which one end of said strip of photographic material is connected and means for rotationally and pivotally mounting said takeup spool within said housing;
access means for permitting an externally mounted force-applying member to be selectively introduced into said cassette into contact with said idler to restrain rotational movement of said idler on said post; and
means for preventing light rays passing into said access means from being introduced into the interior of said cassette including a projection on the end of said idler spaced from said recess.

18. A motion-picture-film-handling cassette comprising:
a housing;
an elongated strip of photographic material;
a film gate permitting image-carrying light rays to be introduced into and/or projected from said cassette; and
a self-aligning film-handling system for progressively advancing said elongated strip of photographic material past said film gate, said self-aligning film-handling system including at least one spool around which said strip of photographic material is coiled as it is advanced across said film gate, at least one idler around which said strip of photographic material is disposed and which serves in part to define the path along which said strip of photographic material travels within said cassette as it is advanced past said film gate, and means for mounting both said spool and said idler for rotational and pivotal motion within said housing.

* * * * *